United States Patent [19]
Kobayashi et al.

[11] Patent Number: 5,106,555
[45] Date of Patent: Apr. 21, 1992

[54] PROCESS FOR THE CONTINUOUS PRODUCTION OF HIGH-STRENGTH AND HIGH-MODULUS POLYETHYLENE MATERIAL

[75] Inventors: Seizo Kobayashi; Takashi Mizoe; Yoshimu Iwanami; Shigeki Yokoyama, all of Yokohama; Kazuhiko Kurihara, Tokyo; Hiroshi Yazawa, Kunitachi; Mihoko Okada, Tokyo, all of Japan

[73] Assignees: Nippon Oil Co., Ltd.; Petrochemicals Co., Ltd. Nippon; Polymer Processing Research Institute Ltd., all of Tokyo, Japan

[21] Appl. No.: 557,654

[22] Filed: Jul. 25, 1990

[30] Foreign Application Priority Data

Jul. 28, 1989 [JP] Japan .................................. 1-194268

[51] Int. Cl.⁵ ...................... B29C 43/24; B29C 43/30
[52] U.S. Cl. ............................. 264/112; 264/113; 264/119; 264/120; 264/122; 264/126
[58] Field of Search ............ 264/112, 113, 119, 120, 264/123, 126, 210.1, 280, 288.4, 122, 210.3, 211

[56] References Cited

U.S. PATENT DOCUMENTS

| | | | |
|---|---|---|---|
| 4,487,875 | 12/1984 | Nakajima et al. | 264/211 |
| 4,764,326 | 8/1988 | Hakim | 264/211 |
| 4,820,466 | 4/1989 | Zachariades | 264/119 |
| 4,879,076 | 11/1989 | Sano et al. | 264/28 |
| 4,925,880 | 5/1990 | Stein | 521/98 |
| 5,004,778 | 4/1991 | Waagen et al. | 524/474 |

FOREIGN PATENT DOCUMENTS

| | | |
|---|---|---|
| 253513 | 1/1988 | European Pat. Off. |
| 274536 | 7/1988 | European Pat. Off. |
| 374785 | 6/1990 | European Pat. Off. |
| 402484 | 12/1990 | European Pat. Off. |
| 9007413 | 7/1990 | World Int. Prop. O. |

Primary Examiner—Mary Lynn Theisen
Attorney, Agent, or Firm—Oblon, Spivak, McClelland, Maier & Neustadt

[57] ABSTRACT

A process is provided for the continuous production of a high-strength and high-modulus polyethylene material having excellent properties. According to the process, powder composed of ultra-high-molecular-weight polyethylene powder as a principal component is subjected to compression molding, rolling and stretching. The polyethylene powder has an intrinsic viscosity of 5-50 dl/g as measured at 135° C. in decalin. The compression molding is carried out by feeding the polyethylene powder between endless belts arranged in an opposing up-and-down relation, and conveying the polyethylene powder while holding the same between the endless belts and at the same time, continuously compression molding the polyethylene powder at a temperature lower than its melting point by a compressing means provided inside of the endless belts. In at least one of the compression molding step and rolling step, an olefin polymer having a molecular weight lower than the polyolefin polymer is concurrently processed.

22 Claims, 1 Drawing Sheet

PROCESS FOR THE CONTINUOUS PRODUCTION OF HIGH-STRENGTH AND HIGH-MODULUS POLYETHYLENE MATERIAL

BACKGROUND OF THE INVENTION a) Field of the Invention

The present invention relates to a process for the continuous production of a high-strength and high-modulus polyethylene material having a modified surface. More specifically, the present invention provides a process for continuously producing a high-strength and high-modulus polyethylene material having adhesive properties by causing a specific olefin polymer to exist on or in ultra-high-molecular-weight polyethylene powder or layer upon compression molding the polyethylene powder and/or upon rolling the compression-molded layer.

b) Description of the Related Art

Polyolefins having extremely high molecular weights, namely, so-called ultra-high-molecular weight polyolefins have found wide-spread commercial utility in various fields, as unique engineering plastics having not only excellent impact resistance and abrasion resistance but also self-lubricating properties. Since these ultra-high-molecular weight polyolefins have molecular weights far higher than general-purpose polyolefins, they are expected to be able to furnish molded products having high strength and high tensile modulus provided that they can be highly oriented. High orientation of the ultra-high-molecular weight polyolefins has hence been investigated in various ways.

However, compared with general-purpose polyolefins, ultra-high-molecular weight polyolefins have higher melt viscosity and when molded or otherwise processed by conventional methods, exhibit much poorer moldability and processability. Under the circumstances, they cannot not be highly oriented by stretching.

According to a conventional process for the high orientation of an ultra-high-molecular weight polyolefin, the ultra-high-molecular weight polyolefin is formed into a dilute solution in a solvent such as xylene, decalin or kerosine. The dilution solution is cooled and isothermally crystallized, whereby a single-crystal mat is obtained. This single-crystal mat is then subjected to solid-phase extrusion, stretching, etc. Even with this process, the problem that a great deal of a solvent is required upon production of a single-crystal mat still remains unsolved.

With a view to overcoming the problem described above, the present inventors proposed a process for the production of a high-strength and high-modulus polyolefin material, in which powder of an ultra-high-molecular weight polyolefin is compression-molded at a temperature lower than the melting point of the powder without dissolution or fusion, followed by rolling and stretching (Japanese Patent Application Laid-Open Nos. 41512/1988 and 66207/1988). The present inventors then came up with some improvements to the compression molding step of the above-mentioned process, on which Japanese Patent Application No. 320401/1988 was filed.

On the other hand, materials such as fibers and sheets, which are obtained by subjecting ultra-high-molecular weight polyethylene to high orientation have high strength and tensile modulus. They are therefore expected to find a wide variety, including single use, lamination, and combination with different kinds of materials into composite materials.

Even if bonding of a high-strength and high-modulus polyethylene material with an epoxy resin or unsaturated polyester which is generally used as a base resin for composite materials is attempted with a conventional adhesive so as to provide a composite material, no sufficient bonding strength is obtained as the polyethylene material does not contain polar groups. On the other hand, fusion bonding of high-strength and high-modulus materials for their lamination must be conducted at a temperature lower than the melting point. Such a low temperature however can provide only low bonding strength, resulting in the problem that satisfactory laminate or composite material cannot be obtained.

SUMMARY OF THE INVENTION

A first object of the present invention is to provide a high-strength and high-modulus polyethylene material by compression-molding, rolling and then stretching powder composed principally of ultra-high-molecular-weight polyethylene powder.

A second object of the present invention is to provide a high-strength and high-modulus polyethylene material by causing a high-strength and high-modulus polyethylene to orient to a high degree.

A third object of the present invention is to provide a process for the production of a high-strength and high-modulus polyethylene material which can be easily combined with another material or can be easily laminated with the sam high-strength and high-modulus polyethylene material.

The above objects have now been attained by the provision of a process for the continuous production of a high-strength and high-modulus polyethylene material by compression molding, rolling and stretching of powder which is composed of ultra-high-molecular-weight polyethylene powder as a principal component. The ultra-high-molecular-weight polyethylene powder has an intrinsic viscosity of 5–50 dl/g as measured at 135° C. in decalin. The compression molding step comprises feeding the ultra-high-molecular-weight polyethylene powder as a principal component between a combination of endless belts arranged in an opposing up-and-down relation, and conveying the ultra-high-molecular-weight polyethylene powder while holding the same between said endless belts and at the same time, continuously compression molding said ultra-high-molecular-weight polyethylene powder at a temperature lower than the melting point thereof by a compressing means provided inside at least one of the endless belts. In at least one of the compression molding step and rolling step, an olefin polymer having a molecular weight lower than the ultra-high-molecular-weight polyolefin polymer is concurrently processed.

The process of the present invention has inter alia the following excellent features:

1) The process has made it possible to conduct compression molding under a pressure lower than those required heretofore without the need for such an irksome operation as melting or solvent dissolution of polyethylene in the polymerization and the molding and processing (compression molding, rolling and stretching) steps, so that a high-strength and high-modulus polyethylene material can be produced continuously and easily.

2) The process features the concurrent processing of the specific olefin polymer in the compression molding step and/or the rolling step. This has made it possible to provide a surface-modified, high-strength and high-modulus polyethylene material having improved surface bonding properties without deterioration of its strength and tensile modulus.

DETAILED DESCRIPTION OF THE INVENTION

Figure 1:
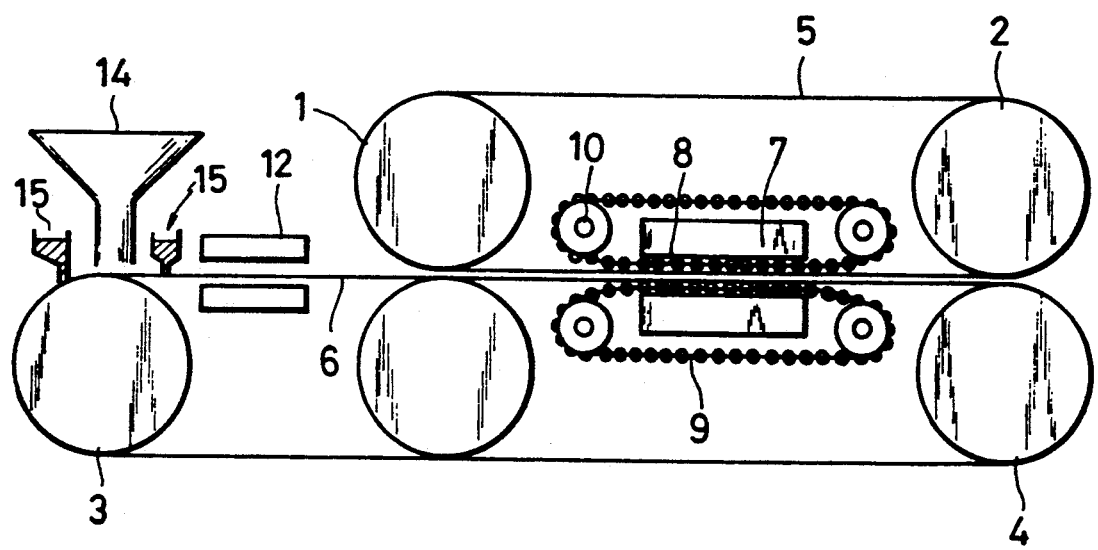
FIG. 1 is a simplified schematic front elevation of an apparatus suitable for use in the practice of the production process of the invention.

The ultra-high-molecular-weight polyethylene powder useful in the practice of the invention may have an intrinsic viscosity [$\eta$] of 5-50 dl/g, preferably 8-40 dl/g, more preferably 10-30 dl/g. Its viscosity-average molecular weight may range from 500,000 to 1,200,000, preferably from 900,000 to 9,000,000, more preferably from 1,200,000 to 6,000,000. Intrinsic viscosities [$\eta$] lower than 5 dl/g result in sheets, films or the like, which have poorer mechanical properties. Such low intrinsic viscosities are therefore not preferred. On the other hand, intrinsic viscosities higher than 50 dl/g lead to poorer processability such as poorer stretchability. Such high intrinsic viscosities are not preferred either.

The density of the ultra-high-molecular-weight polyethylene powder may generally be 0.930-0.970 g/cm$^3$, with 0.935-0.960 g/cm$^3$ being preferred.

The high-strength and high-modulus polyethylene material employed in the invention can be obtained, for example, by homopolymerizing ethylene or copolymerizing ethylene and an α-olefin in the presence of a catalyst which comprises a catalyst component containing at least one compound of at least one transition metal element in groups IV-VI of the periodic table. The catalyst may additionally contain an organometallic compound.

Exemplary usable α-olefins are those having 3-12, preferably 3-6 carbon atoms. Specific examples include propylene, butene-1, 4-methylpentene-1, hexene-1, octene-1, decene-1 and dodecene 1. Among these, particularly preferred are propylene, butene-1, 4-methylpentene-1 and hexene-1. As comonomer or comonomers, one or more of dienes, for example, butadiene, 1,4-hexadiene, vinylnorbornene, ethylidene-norbornene and the like may be employed in combination. The content of the α-olefin in the ethylene-α-olefin copolymer may be 0.001-10 mole %, preferably 0.01-5 mole %, more preferably 0.1-1%.

Preferred specific examples of the at least one compound of at least one transition metal of groups IV-VI of the periodic table, said compound making up the catalyst component, include titanium compounds, vanadium compounds, chromium compounds, zirconium compounds and hafnium compounds. Two or more of these compounds may be used in combination.

Exemplary titanium compounds include titanium halides, alkoxyhalides, alkoxides and halogen oxides. Titanium(IV) compounds and titanium(III) compounds are suitable. Specific exemplary titanium(IV) compounds include those represented by the following formula:

$$Ti(OR)_nX_{4-n}$$

wherein R is an alkyl group having 1-20, preferably 1-12 carbon atoms or an aralkyl group, X is a halogen atom, and n is $0 \geq n \geq 4$. Titanium tetrachloride is particularly preferred.

Typical titanium(III) compounds include titanium trihalides such as titanium trichloride. Also included are the titanium(III) compounds which are obtained by reducing, with an organometallic compound of a metal of group I-III of the periodic table, titanium(IV) alkoxyhalides represented by the following formula:

$$Ti(OR)_mX_{4-m}$$

wherein R is an alkyl group having 1-20 carbon atoms, an aryl group or an aralkyl group, X is a halogen atom, and m is $0 \geq m \geq 4$.

Of these titanium compounds titanium(IV) compounds are especially preferred.

Illustrative vanadium compounds include vanadium halides, alkoxyhalides, alkoxides and halogen oxides. Described specifically, there are vanadium(IV) compounds, e.g., vanadium tetrahalides such as vanadium tetrachloride, and tetraethoxyvanadium; vanadium(V) compounds such as vanadium oxytrichloride, ethoxydichlorovanadyl, triethoxyvanadyl and tributoxyvanadyl; and vanadium(III) compounds such as vanadium trichloride and vanadium triethoxide.

The above titanium compounds or vanadium compounds may be treated with one or more electrondonating compounds. Exemplary electron-donating compounds include ethers, thioethers, thiolphosphines, stibines, arsines, amines, amides, ketones, and esters.

The titanium compounds or vanadium compounds may be used in combination with a magnesium compound. Usable exemplary magnesium compounds include metallic magnesium, magnesium hydroxide, magnesium carbonate, magnesium oxide, magnesium fluoride, magnesium chloride, magnesium bromide, and magnesium iodide; double salts, double oxides, double carbonates, double chloride and double hydroxides, each of which contains a metal selected from silicon, aluminum and calcium in combination with magnesium; magnesium compounds obtained by treating or reacting these inorganic solid compounds with oxygen-containing compounds, sulfur-containing compounds, aromatic hydrocarbons or halogen-containing substances; and magnesium compounds obtained by incorporating the above magnesium compounds in silicon-containing and/or aluminum-containing oxides.

When the titanium compound or magnesium compound is used in combination with the magnesium compound, no particular limitation is imposed on the manner in which both the compounds are combined together. A suitable known method can be employed.

Examples of the above-described oxygen-containing compounds include water; organic oxygen-containing compounds such as alcohols, phenols, ketones, aldehydes, carboxylic acids, esters, polysiloxanes and acid amides; and inorganic oxygen-containing compounds such as metal alkoxides, metal oxychlorides. Illustrative sulfur-containing compounds include organic sulfur-containing compounds such as thiols and thioethers; and inorganic sulfur-containing compounds such as sulfur dioxide, sulfur trioxide and sulfuric acid. Exemplary aromatic hydrocarbons include various monocyclic and polycyclic aromatic hydrocarbon compounds such as benzene, toluene, xylene, anthracene and phenanthrene. Illustrative halogen-containing substances include chlorine; and compounds such as hydrogen chloride, metal chlorides and organohalides.

Other illustrative catalyst systems include those composed of reaction products of organomagnesium compounds and titanium compounds, such as Grignard compounds, in combination with organoaluminum compounds.

Still other exemplary catalyst system include those composed of solid substances, which have been obtained by combining inorganic oxides such as $SiO_2$ and $Al_2O_3$ with the above-described solid catalyst components containing at least magnesium and titanium, in combination with organoaluminum compounds.

In these catalyst systems, the titanium compound can be used as an adduct with an organic carboxylate ester, and the above-described magnesium-containing inorganic solid compound can be used subsequent to its contact to and treatment with an organic carboxylate ester. Further, no problem will arise from the use of the organoaluminum compound as an adduct with an organic carboxylate ester. Anyway, catalyst systems prepared in the presence of an organic carboxylate ester can be used without any problem.

Exemplary specific chromium compounds include catalysts called generally "Phillips catalysts", which are obtained by causing chromium trioxide or compounds, said compounds being capable of at least partly forming a chromium oxide upon calcination, to be supported on inorganic oxide carriers. Examples of the inorganic oxide carriers include silica, alumina, silica-alumina, titania, zirconia, thoria, and mixtures thereof, among which silica and silica-alumina are preferred.

Illustrative of the chromium compound to be carried include chromium oxides and compounds capable of at least partly forming a chromium oxide upon calcination, for example, chromium halides, oxyhalides, nitrates, acetates, sulfates and alcoholates. Described specifically, there are chromium trioxide, cromyl chloride, potassium dichromate, ammonium chromate, chromium nitrate, chromium acetate, chromium acetylacetonate, and di-t-butyl chromate.

Bearing of the chromium compound on a carrier can be carried out by a known method such as impregnation, solvent distillation, or sublimation. A suitable method can be chosen depending on the type of the chromium compound to be used. Chromium may be borne in a proportion of 0.1-10 wt. %, preferably 0.3-5 wt. %, more preferably 0.5-3 wt. %, all in terms of chromium atoms based on the associated carrier.

The carrier with the chromium compound borne thereon as described above is then baked to active the same. The baking activation is usually conducted in a non-reducing atmosphere substantially free of water, for example, in the presence of oxygen. It may however be effected in the presence of an inert gas or under reduced pressure. Use of dry air is preferred. The baking is carried out at 450° C. or higher, preferably at 500°-900° C., for several minutes to several hours, preferably for 0.5-10 hours. During the baking, it is preferred to use sufficient dry air so that the activation can be effected in a fluidized state.

The activity and the like may be adjusted by making use of a conventional method, for example, by adding a titanate, a fluorine-containing salt or the like when the carrier is caused to bear the chromium compound or the chromium-compound-bearing carrier is baked.

The chromium-compound-bearing carrier may also be used subsequent to its reduction with carbon monoxide, ethylene or an organoaluminum compound.

Illustrative of the zirconium compound and hafnium compound include zirconium compounds and hafnium compounds, which contains a conjugated-$\pi$-electron-containing group as a ligand. Specific exemplary zirconium compounds and hafnium compounds include those represented by the following formula:

$$R^1_a R^2_b M R^3_c R^4_d$$

wherein M is a zirconium or hafnium atom, $R^1$, $R^2$, $R^3$ and $R^4$ are each a hydrocarbon residuum having 1-20 carbon atoms, a halogen atom or a hydrogen atom with the proviso that at least one of $R^1$, $R^2$, $R^3$ and $R^4$ is the hydrocarbon residuum, and a, b, c and d are values satisfying the following equation:

$$a+b+c+d=4$$

Preferred examples of the hydrocarbon residuum in the above formula include alkyl groups, aryl groups, cycloalkyl groups, aralkyl groups, alkoxyl groups, cycloalkadienyl groups, sulfur-containing hydrocarbon residua, nitrogen-containing hydrocarbon residua, and phosphorus-containing hydrocarbon residua.

Exemplary alkyl groups include methyl, ethyl, propyl, isopropyl, butyl, hexyl, octyl, 2-ethyl hexyl, decyl and oleyl. Illustrative aryl groups include phenyl and tolyl. Typical cycloalkyl groups include cyclopentyl, cyclohexyl, cyclooctyl, norbonyl and bicyclononyl. Specific aralkyl groups include benzyl and neophyl.

Illustrative cycloalkadienyl groups include cyclopentadienyl, methylcyclopentadienyl, ethylcyclopentadienyl, dimethylcyclopentadienyl, indenyl and tetrahydroindenyl. Specific alkoxyl groups include methoxy, ethoxy, propoxy and butoxy. Illustrative sulfur-containing hydrocarbon residua include thioethyl and thiophenyl. Further, typical nitrogen-containing hydrogen residua include dimethylamido, diethylamido and dipropylamide.

In addition, unsaturated aliphatic residua such as vinyl, ally, propenyl, isopropenyl and 1-butenyl as well as unsaturated alicyclic groups such as cyclohexenyl can also be mentioned by way of example. Exemplary halogen atoms include fluorine, chlorine and bromine.

Needless to say, these zirconium compounds and hafnium compounds can also be used by having them borne on the inorganic oxide carriers described above.

Illustrative of the organometallic compound usable in the process of the invention for the production of the ultra-high-molecular-weight polyethylene powder include organometallic compounds of metals of group I-IV of the periodic table, which are known as components of Ziegler catalysts. Preferred are organoaluminum compounds represented by the following formula:

$$R_n AlX_{3-n}$$

wherein R is an alkyl group having 1-20 carbon atoms, an aryl group or an alkoxyl group, X is a halogen atom, and n is $0 < n \leq 3$ with the proviso that, when $n \geq 2$, the individual R may be the same or different; and organozinc compounds represented by the following formula:

$$R_2 Zn$$

wherein $R_2$ may be the same or different and are individually alkyl groups having 1-20 carbon atoms. These organoaluminum and organozinc compounds may be used in combination.

Specific exemplary organoaluminum compounds include triethylaluminum, triisobutylaluminum, tri-n-hexylaluminum, diethylaluminum chloride, monoethoxydialkyl aluminums, and diethoxymonoalkyl aluminums. It is also possible to use compounds obtained by reacting trialkylaluminums with water, which are represented by the following formula:

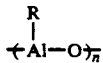

wherein R is a hydrocarbyl group having 1-18 carbon atoms, n is $2 \leq n \leq 100$, preferably $2 \leq n \leq 50$.

No particular limitation is imposed on the amount of the organometallic compound to be used. In general, it may be used in an amount 0.1-1,000 molar times the associated transition metal compound.

The polymerization reaction can be carried out in a vapover phase or a solvent inert to the above-described catalyst while maintaining the reaction system substantially free of oxygen, water and the like. Illustrative of the inert solvent include aliphatic hydrocarbons such as butane, isobutane, pentane, hexane, octane, decane and dodecane; alicyclic hydrocarbon such as cyclepentane and cyclohexane; aromatic hydrocarbons such as benzene and toluene; and petroleum fractions. Monomer or monomers of the polymerization reaction can also be used as a solvent. The polymerization temperature is lower than the melting point of the ultra-high-molecular-weight polyethylene to be formed, preferably from $-20°$ to $+110°$ C., more preferably from $0°$ to $90°$ C.

If the polymerization temperature is higher than the melting point of the ultra-high-molecular-weight polyethylene to be obtained, the polyethylene cannot be stretched at any draw ratio of 20-fold or greater in the stretching stage as a subsequent step. Such high polymerization temperatures are therefore not preferred.

It is usually desirable to control the polymerization pressure within a range of 0-70 kg/cm²G, preferably 0-60 kg/cm²G.

The molecular weight can be regulated by changing the polymerization conditions, for example, by adjusting the polymerization temperature, the polymerization pressure, the kind of the catalyst and/or the molar ratio of the catalyst components, and/or by adding hydrogen gas into the polymerization system.

It is also possible to conduct, without problems, the polymerization in two or more stages in which different polymerization conditions such as hydrogen concentrations and/or polymerization temperatures are used.

The ultra-high-molecular-weight polyethylene thus obtained may preferably be in a granular or powdery form in general, although no particular limitation is imposed on the shape of the polyethylene. The particle size may be 2,000 μm or smaller, with 1,000 μm or smaller being preferred. A narrower particle size distribution is desired, because the narrower the particle size, the better the resulting sheet.

The olefin polymer useful in the practice of the invention may preferably be selected from the group consisting of (1) ethylene polymers produced using a Ziegler catalyst, ethylene-α-olefin copolymers, ethylene polymers and copolymers produced by high-pressure radical polymerization, and mixtures thereof and (2) modified ethylene polymers and copolymers obtained by graft-reacting, in the presence of an unsaturated carboxylic acid and/or a derivative thereof and an organic peroxide, the ethylene polymers produced using the Ziegler catalyst, the ethylene-α-olefin copolymers, the ethylene polymers and copolymers produced by high-pressure radical polymerization, and the mixtures. These ethylene polymers and copolymers generally have a molecular weight lower than the ultra-high molecular-weight polyethylene powder described above and have an intrinsic viscosity [η] of generally 0.5-3 dl/g, preferably 0.8-2 dl/g, and a melt index of generally 0.1-100 g/10 min, preferably 0.5-10 g/10 min as measured at 190° C. under the load of 2.16 kg in accordance with ASTM-D1238-65T.

A variety of α-olefins can be used as the α-olefins in the ethylene-α-olefin copolymers which are produced using a Ziegler catalyst. Preferred are α-olefins having 3-12 carbon atoms, with those having 3-8 carbon atoms being more preferred. Specific exemplary α-olefins include propylene, butene-1, pentene-1, 4-methylpentene-1, hexene-1, octene-1, decene-1, dodecene-1, and mixtures thereof. The preferred content of the α-olefin in each ethylene-α-olefin copolymer may be 20 mole % or lower, with 15 mole % or lower being desired.

The above-described high-pressure radical polymers include ethylene-vinyl ester copolymers and ethylene-acrylate ester copolymers, in each of which the concentration of the comonomer is not higher than 30 wt. %, preferably 25 wt. % or lower.

Comonomer concentrations higher than 30 wt. % lead to higher surface tack, thereby making it difficult to perform compression molding and/or rolling.

These ethylene polymer and copolymers usable in the invention generally have a density not higher than 0.935 g/cm³, preferably 0.930–0.860 g/cm³, more preferably 0.930–0.910 g/cm³. A density higher than 0.935 g/cm³ result in a smaller difference in melting point between the bonding layer and the stretched polyethylene layer. This in turn results in narrower temperature conditions usable upon lamination under heat, thereby failing to provide sufficing bonding strength. Such high densities are therefore not preferred.

These ethylene polymer and copolymers may be suitably blended, to extent no impairing the objects of the invention, with one or more of homopolymers and copolymers other than those described above, for example, one or more of homopolymers and mutual copolymers of ethylene, propylene, butene-1, 4-methylpentene-1, hexene-1, octene-1 and the like, ethylene-propylene rubbers, ethylene-propylene-diene copolymer rubbers, polyisobutylene, and mixtures thereof.

Desired examples of the unsaturated carboxylic acid useful upon modification of the above ethylene (co)-polymer include monobasic acids and dibasic acids. Described specifically, there are acrylic acid, propionic acid, methacrylic acid, crotonic acid, isocrotonic acid, oleic acid, elaidic acid, maleic acid, fumaric acid, citraconic acid, mesaconic acid, and mixtures thereof. Illustrative derivatives of unsaturated carboxylic acids include metal salts, amides, esters and anhydrides of the above-described unsaturated carboxylic acids. Of these, maleic anhydride is most preferred.

Suitably usable exemplary organic peroxides include benzoyl peroxide, lauryl peroxide, azobisisobutyronitrile, dicumyl peroxide, t-butyl hydroperoxide, α,α'- bis(t-butylperoxydiisopropyl)benzene, di-t-butyl peroxide, 2,5-di(t-butylperoxy)hexene.

As a method for modifying the above ethylene (co)polymer with the unsaturated carboxylic acid and/or its derivative, the unsaturated carboxylic acid and/or its derivative is added to the ethylene (co)polymer and the resulting mixture is heated and reacted in the presence of the organic peroxide. Here, the unsaturated carboxylic acid or its derivative can be added in a proportion of 0.05-10 wt. %, preferably 0.1-7 wt. % based on the ethylene (co)polymer.

On the other hand, the organic peroxide can be used in a proportion of 0.005-2 parts by weight, preferably 0.01-1.0 parts by weight per 100 parts by weight of the sum of the ethylene (co) polymer and the unsaturated carboxylic acid. If the organic peroxide is added in a proportion smaller than 0.005 part by weight, the ethylene (co)polymer cannot be modified to substantial extent. On the other hand, the addition of the organic peroxide in a proportion greater than 2.0 part by weight can hardly bring about extra effects but to the contrary, may induce excessive decomposition or crosslinking reaction.

The reaction can be effected by melting and mixing the ethylene (co)polymer, the unsaturated carboxylic acid and/or its derivative and the organic peroxide in the absence of any solvent in a kneader, for example, extruder and Bumbury mixer or the like or by heating and mixing them in a solvent, for example, an aromatic hydrocarbon such as benzene, xylene or toluene or an aliphatic hydrocarbon such as hexane, heptane or octane. It is therefore to be noted that no particular limitation is imposed on the manner of the reaction. It is however preferred to conduct the reaction in an extruder in view of the excellent economy and the continuity with the subsequent steps.

In so far as the objects of the invention are unimpaired, no particular limitation is imposed on the shape of the olefin polymer. The olefin polymer may therefore be in the form of a sheet, a film, fibers, rods, a non-woven fabric or powder. Described specifically, it is possible to use the olefin polymer after forming it into a film having a thickness of 10–200 $\mu$m, preferably 20–100 $\mu$m by a method known per se in the art. The film may then be stretched to use it in the form of fibers or a non-woven fabric. When the olefin polymer is employed as powder, the particle size may be 1,000 $\mu$m or smaller, more preferably 500 $\mu$m or smaller. The narrow the particle size distribution, the more desirable.

A detailed description will next be made of the process for the production of the high-strength and high-modulus polyethylene material. In the present invention, the high-strength and high-modulus polyethylene material is produced as described above, namely, by compression-molding the ultra-high-molecular weight polyethylene powder at a temperature lower than the melting point of the polyethylene by the specific compression means, followed by rolling and then stretching. Upon compression molding and/or rolling, the olefin polymer is caused to exist in or on the ultra-high-molecular weight polyethylene powder or the compressed layer thereof, in other words, is concurrently processed. The term "caused to exist in or on" as used herein means that the olefin polymer is dispersed inside and/or on a surface of the ultra-high-molecular weight polyethylene powder or the compressed layer thereof and as an alternative, that the olefin polymer is superposed as a layer on a layer of the ultra-high-molecular weight polyethylene powder or a compressed layer of the ultra-high-molecular weight polyethylene powder.

This can be practiced by the following representative methods:

1) In the compression molding step, the olefin polymer is mixed as powder, rods or fibers in the ultra-high-molecular-weight polyethylene powder.

2) In the compression molding step, the olefin polymer is spread as powder, rods or fibers to the surface of the ultra-high-molecular-weight polyethylene powder.

3) In the compression molding step, the olefin polymer is superposed as a sheet, film or non-woven fabric to the surface of the ultra-high-molecular-weight polyethylene powder.

4) In the rolling step, the olefin polymer is spread as powder, rods or fibers to the surface of compression-molded layer of the ultra-high-molecular-weight polyethylene powder.

5) In the rolling step, the olefin polymer is superposed as a sheet, film or non-woven fabric to the surface of compression-molded layer of the ultra-high-molecular-weight polyethylene powder to form multiple layers.

In the process of the present invention for the production of the high-strength and high-modulus polyethylene material, the olefin polymer can generally be used in a proportion of 1–40 parts by weight, preferably 5–25 parts by weight per 100 parts by weight of the ultra-high-molecular-weight polyethylene powder.

Firstly, the ultra-high-molecular-weight polyethylene powder or the ultra-high-molecular-weight polyethylene powder and olefin polymer (hereinafter called the "powder") is continuously subjected to compression molding, so that a compression-molded sheet is formed. This compression molding will hereinafter be described in brief with reference to FIG. 1 which illustrates one specific example of apparatus suitable for use in the practice of the compression molding.

The apparatus is fundamentally constructed of a combination of endless belts 5,6 arranged in an opposing up-and-down relation and maintained taut by associated rolls 1–4, platens 7 for compressing the powder via the corresponding endless belts 5,6, and roller trains 8 connected together and rotatably disposed between the corresponding platens 7 and the corresponding endless belts 5,6.

The compressing means in the invention comprises the platens 7 arranged inside the corresponding endless belts 5,6 and the roller trains 8 rotatably disposed between the corresponding platens 7 and the corresponding endless belts 5,6. Preferably, each of the roller trains 8 has a number of rollers arranged closely at intervals only sufficient to avoid their mutual contact with their axes of rotation extending substantially at right angles relative to the travelling direction of the corresponding endless belt.

These rollers are rotatable about their corresponding central shafts. These shafts are fixed at both ends thereof on the corresponding chains 9. The chains 9 are maintained in engagement with corresponding sprockets 10 arranged on both upstream and downstream sides of the corresponding platens 7. It is preferred to drive these rollers trains 8 at a speed about half the running speed of the endless belts 5,6.

Each roller train 8 may be fixedly disposed between the endless belt 5 or 6 and the platen 7. A problem however arises with respect to the durability of the apparatus because frictional force is produced by slips between each roller train and its corresponding endless belt and also between each roller train and its corresponding platen.

No particular limitation is imposed on the platens, as long as their surfaces at which the platens are brought into contact with the corresponding roller trains 8 are smooth and can evenly transmit pressure. The length of each platen in the running direction of the associated endless belt is usually 30-400 cm, with about 50-200 cm being preferred. The average pressure which each platen applies to the corresponding endless belt can be suitably chosen. However, it is generally sufficient to apply an average pressure not higher than 100 kg/cm$^2$, preferably 0.1-50 kg/cm$^2$, more preferably 0.1-20 kg/cm$^2$, especially 0.5-10 kg/cm$^2$, notably 1.0-8.0 kg/cm$^2$.

Although it is the primary role of the platens to compress the powder via the corresponding endless belts, the platens may also be used as heating means for the powder. In the process of the invention, to obtain a high-strength and high-modulus polyethylene material through the subsequent rolling and stretching steps, it is extremely important to conduct the compression molding step at a temperature not higher that the melting point o the polyethylene powder to be compression-molded. To obtain a good compression-molded layer of the powder, it is desirable to conduct the compression-molding step within a suitable temperature range below the melting point, usually about 20° C. but below the melting point, preferably above 50° C. but below the melting point, more preferably at 90°-140° C., most preferably 110°-135° C.

Figure 2:
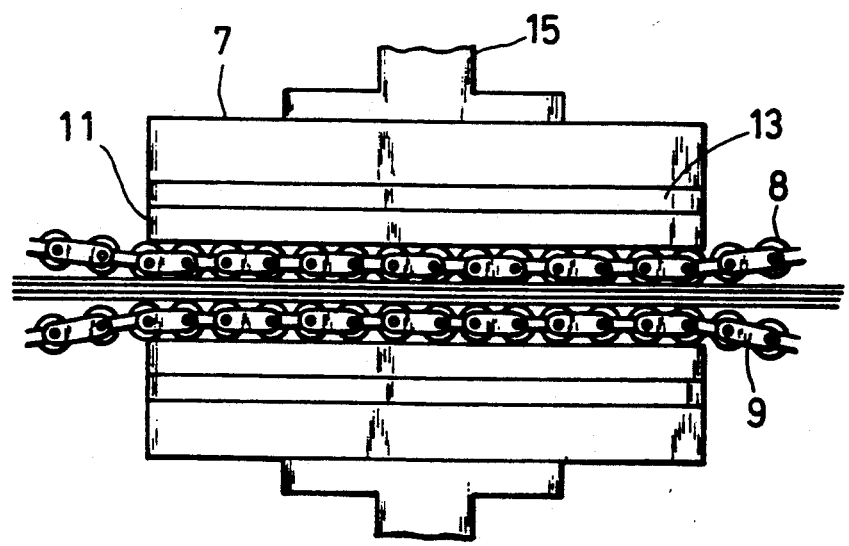
FIG. 2 illustrates, on an enlarged scale, a compressing zone and its vicinity area of the apparatus of FIG. 1.

As a method for heating the powder within such a temperature range, it is most preferable to directly heat the endless belts at the compression zone. It is practical and convenient to arrange a heating means 11 in each platen 7 as shown in FIG. 2 so that the powder can be heated by the platens 7 by way of the roller trains 8 and endless belts 5,6. It is also practical and convenient to arrange a preheater 12 in the proximity of the endless belt 6 as depicted in FIG. 1 so that the powder can be heated by the preheater 12.

As to the manner of arrangement of the heating means 11 in each platen 7, an electric heater can be embedded within the platen 7 after providing the platen 7 with a heat insulation layer 13. As an alternative, a flow passage for the circulation of a heating medium can be disposed inside each platen 7 to heat the platen 7 with the heating medium.

To practice the continuous production process of the invention by using the exemplified apparatus, the ultra-high-molecular-weight polyethylene powder charged and stored in a hopper 14 is caused to drop onto the endless belt 6.

As methods for having the olefin polymer exist in the ultra-high-molecular-weight polyethylene powder in the compression molding step, there are for example (1) a method in which at least one olefin polymer selected from the powdery olefin polymer itself, the olefin polymer dissolved in an organic solvent such as benzene, toluene, xylene, o-cyclobenzene, cyclohexane, decalin or tetralin, and the olefin polymer dispersed in a liquid by using a liquid dispersant such as polyethylene glycol, polypropylene glycol or glycerin is spread by a spreader 15 and/or a spreader 15'; (2) a method in which the olefin polymer formed beforehand into a sheet, film, fibers, non-woven fabric or the like is downwardly fed in advance onto the endless belt 6 and the ultra-high-molecular-weight polyethylene powder is then dropped onto the olefin polymer from the hopper 14; and (3) a method making use of the above methods (1) and (2) in combination.

The running speed of each endless belt may generally be 10-500 cm/min, preferably about 50-200 cm/min, although it also depends on the length of the platen and the conditions for the compression molding. The polyethylene powder or the mixture of the polyethylene powder and the olefin polymer, which is placed on the endless belt 6, is formed into a predetermined cross-sectional shape by a doctor blade. After the polyethylene powder or the mixture of the polyethylene powder and the olefin powder is preheated by the preheater 12 if necessary, it is conveyed to the preforming zone defined by the upper and lower endless belts 5,6. The thus-preformed powder layer is then conveyed to the compression zone where the roller trains 8 and platens 7 are arranged. In the compression zone, each platen 7 receives pressure from hydraulic piston 15. Compression force is then applied to the powder layer by way of the associated roller train 8 and endless belt 5 or 6. At the same time, heat from each heating means 11 is also similarly transmitted to the powder layer by way of the associated roller train 8 and endless belt 5 or 6, whereby the temperature of the powder layer is maintained at a predetermined temperature.

After the sheet compression-molded as described above has been conveyed past the rolls 2 and 4, the sheet leaves the endless belts 5,6.

In the present invention, the compression-molded sheet thus obtained is rolled and then stretched. These steps will hereinafter be described.

Although any suitable known method can be used to roll the compression-molded sheet, it is preferred to obtain a rolled sheet or film by pressing the sheet between pressure rolls, which rotate in opposite directions, while maintaining the sheet in a solid phase without causing the sheet to melt. The deformation ratio of the sheet by the rolling operation can be selected from a wide range of values. Usually, it is desirable to roll the sheet at a rolling ratio (length after rolling/length before rolling) of 1.2-20, preferably 1.5-10. The rolling operation is performed generally above 20° C. but below the melting point of the ultra-high-molecular-weight polyethylene powder employed in the invention, preferably above 50° C. but below the melting point, more preferably at 90°-140° C., most preferably at 110°-135° C. The above rolling operation can of course be carried out in two or more stages.

To have the olefin polymer exist on or in the compression-molded sheet in the rolling step, it is desirable—similarly to the above-described method in which the olefin polymer is caused to exist in or on the preformed powder layer in the compression molding step—to perform the rolling step after spreading and/or superposing, on the surface of the compression-molded sheet, the olefin polymer in one of various forms such as the powdery olefin polymer, the olefin polymer dissolved in an organic solvent, the olefin polymer dispersed in a liquid dispersant, the olefin polymer preformed into a sheet, a film, fibers, a non-woven fabric or the like, and mixtures thereof.

When the olefin polymer is used upon rolling, it is desirable to uniformly spread the olefin polymer over the entire surface of the polyethylene powder while using the polyolefin polymer in an amount as small as possible. From the standpoints of achieving uniform dispersion and the simplification of work, it is preferred to superpose the olefin polymer in the form of a film, a sheet or the like on the compression-molded sheet and then to stretch them together.

As has been described above, the step of causing the olefin copolymer to exist in or on the ultra-high-molecular-weight polyethylene can be performed concurrently with the compression molding step or the rolling step. It is however preferred to perform it concurrently with the rolling step because the overall production process can be easily simplified.

Stretching which is conducted subsequent to the rolling can be performed in various ways. Hot air stretching, cylinder stretching, roll stretching, hot plate stretching, etc. may be mentioned by way of example. Whichever method is employed, stretching is effected by driving a pair of nip rolls or crowbar rolls at different speeds. The stretching temperature may generally be 20°-160° C., preferably 60°-150° C., more preferably 90°-145° C., especially 90°-140° C. The stretching step can also be performed not only in one stage but also in multiple stages. When the stretching step is carried out in multiple stages, it is preferred to increase the stretching temperature toward the last stage.

The stretching speed varies depending on the manner of stretching and the molecular weight and composition of the polymer, and can be determined suitably. In the case of batchwise stretching, the stretching speed is usually in a range of 1-500 mm/min, preferably 1-100 mm/min, more preferably 5-50 mm/min. In the case of continuous stretching, the stretching speed is usually in a range of 0.1-500 m/min, preferably 1-200 m/min, more preferably 10-200 m/min. Taking the economy into consideration, setting of a high stretching speed is preferred.

It is desirable to increase the draw ratio as much as possible, because a higher draw ratio can achieve higher strength and tensile modulus. In the present invention, the total draw ratio which is the sum of the draw ratio upon rolling and that upon stretching can be set usually at 20-fold or more, preferably 60-fold or more, more preferably 80-fold to 200-fold, so that stretching is feasible at an extremely high draw ratio.

According to the process of the invention, it is possible to obtain extremely high-strength and high-modulus polyethylene materials having a tensile modulus of at least 50 GPa and a tensile strength of at least 1 GPa.

Since high-strength and high-modulus polyethylene materials having a modified surface layer can be obtained by the process of the invention, laminates of the polyethylene materials can be obtained with extreme ease. Further, they can be combined with other materials to provide laminates or composite materials.

The present invention will hereinafter be described specifically by the following examples. It is to be noted that the invention is by no means limited to the examples.

Incidentally, the measurements of melting points and other physical data were conducted by the following methods, respectively.

Measuring method of melting point

Each sample (5 mg) was set in a DSC apparatus. The sample was measured at the heating rate of 10° C./min. The endothermic peak temperature was recorded as its melting point.

Measuring methods of tensile strength, tensile modulus and bonding strength

Tensile strength and tensile modulus were measured at 23° C. and the pulling rate of 100 mm/min, using a tensile testing machine "Strograph R". The tensile modulus was calculated using the stress at 0.1% strain. The cross-sectional area of each test piece, said area being needed for the calculation, was determined by measuring the weight and length of the test piece under the assumption that the density of polyethylene be 1 g/cm$^3$.

Using the same testing machine, the interlaminar strength of each sample was determined when the sample was peeled off over 180° at the pulling rate of 150 mm/min. The interlaminar strength was recorded as the bonding strength.

EXAMPLE 1

Formation of sheet

Machine specification

| 1. Rolls | Diameter - 500 mm |
| --- | --- |
| | Face length - 300 mm |
| 2. Steel belts | Thickness - 0.6 mm |
| | Width - 200 mm |
| 3. Small-diameter rollers | Diameter - 12 mm |
| | Face length - 250 mm |
| 4. Platens | Length - 1,000 mm |
| | Width - 200 mm |
| 5. Hydraulic cylinders | Diameter - 125 mm |

Using the compression molding machine of the above specification, ultra-high-molecular-weight polyethylene powder (melting point: 142.5° C.) having an intrinsic viscosity [η] of 18 dl/g as measured at 135° C. in decalin was fed to the hopper 14 of the apparatus shown in FIG. 1. The polyethylene powder was heated to 130° C. and continuously compression-molded at 1 m/min under an average pressure of 6 kg/cm$^2$, thereby continuously forming a sheet of 1.1 mm thick and 100 mm wide.

On the side, 0.2 part by weight of maleic anhydride and 0.02 part by weight of an organic peroxide [2,5-dimethyl-2,5-di(t-butylperoxyhexyne-3)] were added to 100 parts by weight of linear polyethylene (MI: 1.5; density: 0.920; [η]: 1.6 dl/g). The resultant mass was kneaded at 200° C. for 15 minutes in a Banbury mixer and then formed into an inflation film having a thickness of 60 μm.

Rolling

The compression-molded sheet was held between the modified polyethylene films. They were fed between paired rolls rotating at the same peripheral speed of 1 m/min. The rolls had a diameter of 150 mm and a surface length of 300 mm. They were arranged in an up-and-down relation at an interval of 40 μm. Their surface temperatures were controlled at 140° C. As a result, a sheet having a draw ratio of 6-fold was obtained.

Stretching

Both side edge portions (so-called selvages) of the rolled sheet were cut off so that the width of the rolled sheet was adjusted to 75 mm. Using a heated-roll-type stretching machine having a roll diameter of 250 mm, the rolled sheet was stretched at 135° C. and a draw ratio of 16-fold while maintaining the peripheral roll speed at 10 cm/min on the low speed side and at 160 cm/min on the high speed side, whereby a tape-like stretched product having a width of 40 mm was continuously formed. The tensile strength and tensile modulus of the tape were 2.9 GPa and 120 GPa, respectively.

Laminate

The thus-obtained tape-like stretched product having the width of 40 mm was cut into short strips having a length of 40 mm. Two strips were superposed with their stretched directions off set over 90°. They were compressed at 135° C. under 100 kg/cm² for 1 minute on a press, whereby a laminate was obtained. The tensile strength and tensile modulus of the laminate were 0.91 GPa and 65 GPa, respectively. Its bonding strength was 5.4 kg/4 cm so that it was sufficiently usable in an actual application.

EXAMPLE 2

The procedures of Example 1 were repeated except for the use of a 30 μm film of an ethylene-vinyl acetate copolymer (product of Nippon Petrochemicals Co., Ltd.; "V-360", trade name; MI: 10; vinyl acetate content: 10 wt. %) as an olefin polymer, whereby was obtained a tape-like stretched product whose tensile strength and tensile modulus were 3.1 GPa and 115 GPa, respectively. Also obtained was a laminate whose tensile strength, tensile modulus and bonding strength were 1.3 GPa, 82 GPa and 5.1 kg/4 cm.

EXAMPLE 3

The procedures of Example 1 were repeated except that 0.2 part by weight of maleic anhydride and 0.02 part by weight of the organic peroxide [2,5-dimethyl-2,5-di(t-butylperoxyhexyne-3) were added to 100 parts by weight of linear polyethylene (MI: 1.0; density: 0.920; [$\eta$]: 1.9 dl/g) as an olefin polymer, the resulting mass was kneaded at 200° C. for 15 minutes in a Banbury mixer and formed into pellets, the pellets were ground into powder, the powder of the thus-modified polyethylene was spread at a rate of about 30 g/m² over the endless belt 6 from the powder spreader 15, ultra-high-molecular-weight polyethylene powder was then supplied onto the powder of the modified polyethylene from the hopper 14, the resulting powder layer was shaped by a doctor blade to have a predetermined cross, another supply of the powder of the modified polyethylene was spread at the same rate over the powder layer, and the resulting powder layer was then compression-molded, so that a tape-like stretched product was continuously obtained. The tensile strength and tensile modulus of the stretched product were 2.8 GPa and 98 GPa, respectively.

EXAMPLE 4

The procedures of Example 1 were repeated except that ultra-high-molecular-weight polyethylene powder having an intrinsic viscosity [$\eta$] of 16.6 dl/g as measured at 135° C. in decalin and a melting point of 141.6° C. was used and the rolled sheet was slit at widths of 20 mm, so that fibrous stretched strips having a width of 6 mm were obtained. The tensile strength and tensile modulus of the thus-obtained stretched strips were 2.8 GPa and 106 GPa, respectively. The stretched strips were arranged side by side at a density of 4.5 strips/inch in two directions which extend at a right angle. They were fusion-bonded at 130° C. into a cross-laminated non-woven fabric of the ultra-high-molecular-weight polyethylene.

The bonding strength at fusion-bonded areas was 1.6 kg/strip, so that the non-woven fabric was sufficiently usable in an actual application.

COMPARATIVE EXAMPLE 1

A laminate was obtained by following the procedures of Example 1 except that rolling was conducted without holding the compression-molded ultra-high-molecular-weight polyethylene sheet between the modified polyethylene films as a surface modifier. The two stretched strips were easily separated from each other.

COMPARATIVE EXAMPLE 2

The procedures of Example 1 were repeated except that the compression-molding of the sheet was conducted at 150° C. It was only possible to stretch the resulting sheet to a total draw ratio (i.e., the sum of the draw ratios in both rolling and stretching) of 10-fold. The tensile strength and tensile modulus of the resultant laminate were 0.3 GPa and 25 GPa, respectively.

COMPARATIVE EXAMPLE 3

A laminate was obtained by following the procedures of Example 1 except for the use of high-density polyethylene films having a density of 0.956 [obtained by the blown-film extrusion of high-density polyethylene ("E-710", trade name; product of Nippon Petrochemicals Co., Ltd.; MI: 1.0] as a surface modifier. Its bonding strength was 0.6 kg/4 cm. No satisfactory laminate was obtained.

COMPARATIVE EXAMPLE 4

In the procedures of Example 1, rolling was attempted at a roll temperature of 145° C. It was however impossible to achieve any significant stretching. The thus-rolled sheet was stretched. It was found difficult to stretch it 5-fold or more.

EXAMPLE 5

The procedures of Example 1 were repeated except that the compression-molding step were performed at a heating temperature of 135° C. and an average pressure of 45 kgf/cm², the rolling step was carried out at the same upper and lower peripheral speeds of 2 m/min, and the stretching step was conducted as a two-stage stretching step (total draw ratio: 15-fold), namely, at a temperature of 135° C. and at a draw ratio of 5-fold while controlling the roll peripheral speed at 2 m/min on the low speed side and at 10 m/min on the high speed side (in the first stage) and at a temperature of 140° C. and at a draw ratio of 3-fold while controlling the roll peripheral speed at 3 m/min on the low speed side and at 9 m/min on the high speed side (in the second stage), whereby a stretched product and a laminate were obtained. The tensile strength and tensile modulus of the stretched product were 2.5 GPa and 116 GPa, respectively, while the tensile strength and tensile modulus of the laminate of the stretched product were 0.86 GPa and 60 GPa, respectively. The bonding strength of the laminate was 5.8 kg/4 cm. The laminate was therefore found sufficiently usable in an actual application.

We claim:

1. In a process for the continuous production of a high-strength and high-modulus polyethylene material by compression molding, rolling and stretching of powder which is composed of ultra-high-molecular-weight polyethylene powder as a principal component, the improvement wherein (A) said ultra-high-molecular-weight polyethylene powder has an intrinsic viscosity of 5–50 dl/g as measured at 135° C. in decalin, (B) said compression molding step comprises feeding said ultrahigh-molecular-weight polyethylene powder as a principal component between a combination of endless belts arranged in an opposing up-and-down relation, and conveying said ultra-high-molecular-weight polyethylene powder while holding the same between said endless belts and at the same time, continuously compression molding said ultra-high-molecular-weight polyethylene powder at a temperature lower than the melting point thereof by a compressing means provided inside of said endless belts, and (C) in at least one of said compression molding step and rolling step, an olefin polymer having an intrinsic viscosity from 0.5-3 dl/g is concurrently processed.

2. The process of claim 1, wherein said ultra-high-molecular-weight polyethylene powder has a particle size not greater than 2,000 μm.

3. The process of claim 1, wherein said ultra-high-molecular-weight polyethylene has been obtained by the homopolymerization of ethylene or the copolymerization of ethylene and an α-olefin in the presence of a catalyst comprising a catalytic component which contains at least one compound of at least one transition metal element in groups IV to VI of the periodic table.

4. The process of claim 3, wherein said catalytic component additionally contains an organometallic compound.

5. The process of claim 3, wherein said α-olefin has 3-12 carbon atoms.

6. The process of claim 5, wherein said α-olefin is selected from the group consisting of propylene, butene-1, 4-methylpentene-1, hexene-1, octene-1, decene-1 and dodecene-1.

7. The process of claim 6, wherein said ultra-high-molecular-weight polyethylene has been obtained by the copolymerization of 0.001 to 10 mole % of ethylene and 90-99.999 mole % of said α-olefin in the presence of said catalyst.

8. The process of claim 1, wherein said olefin polymer is selected from the group consisting of (1) ethylene polymers produced using a Ziegler catalyst, ethylene-α-olefin copolymers, ethylene polymers and copolymers produced by high-pressure radical polymerization, and mixtures thereof and (2) modified ethylene polymers and copolymers obtained by graft-reacting, in the presence of an unsaturated carboxylic acid and/or a derivative thereof and an organic peroxide, said ethylene polymers produced using said Ziegler catalyst, said ethylene-α-olefin copolymers, said ethylene polymers and copolymers produced by high-pressure radical polymerization, and said mixtures.

9. The process of claim 8, wherein said unsaturated carboxylic acid or said derivative is employed in a proportion of 0.05-10 wt. % based on each of said ethylene polymers produced using said Ziegler catalyst, said ethylene-α-olefin copolymers, said ethylene polymers and copolymers produced by high-pressure radical polymerization, and said mixtures.

10. The process of claim 1, wherein said olefin polymer is in the form of a sheet, a film, fibers, rods, a non-woven fabric, or powder.

11. The process of claim 10, wherein said olefin polymer is in the form of a sheet or film having a thickness in a range of 10-200 μm.

12. The process of claim 10, wherein said olefin polymer is in the form of powder having a particle size not greater than 1,000 μm.

13. The process of claim 1, wherein in said compression molding step, said olefin polymer is in the form of powder, rods or fibers and exists in said ultra-high-molecular-weight polyethylene powder.

14. The process of claim 1, wherein in said compression molding step, said olefin polymer is in the form of powder, rods or fibers and exists on a top surface layer of said ultra-high-molecular-weight polyethylene powder.

15. The process of claim 1, wherein in said compression molding step, said olefin polymer is in the form of a sheet, film or non-woven fabric and exists on a top surface layer of said ultra-high-molecular-weight polyethylene powder.

16. The process of claim 1, wherein in said rolling step, said olefin polymer is in the form of powder, rods or fibers and exists on a compression-molded layer of said ultra-high-molecular-weight polyethylene powder.

17. The process of claim 1, wherein in said rolling step, said olefin polymer is in the form of a sheet, film or non-woven fabric and exists on a compression-molded layer of said ultra-high-molecular-weight polyethylene powder.

18. The process of claim 1, wherein said olefin polymer is employed in a proportion of 1-40 parts by weight per 100 parts by weight of said ultra-high-molecular-weight polyethylene powder.

19. The process of claim 1, wherein in said compression molding step, said compressing means applies compressing force not greater than 100 kg/cm$^2$ to said at least one endless belt.

20. The process of claim 1, wherein said endless belts are driven at 10-500 cm/min.

21. The process of claim 1, wherein in said rolling step, a compression-molded layer of said ultra-high-molecular-weight polyethylene powder is rolled at a ratio of 1.2-20.

22. The process of claim 1, wherein the overall draw ratio by said rolling and stretching is from 60-fold to 200-fold.

* * * * *

UNITED STATES PATENT AND TRADEMARK OFFICE
CERTIFICATE OF CORRECTION

PATENT NO. : 5,106,555
DATED : April 21, 1992
INVENTOR(S) : Seizo Kobayashi et al.

It is certified that error appears in the above-identified patent and that said Letters Patent is hereby corrected as shown below:

Title page, item (73):
    The second assignee's name is incorrect, should be,

--Nippon Petrochemicals Co., Ltd.;--.

Signed and Sealed this

Sixth Day of July, 1993

Attest:

MICHAEL K. KIRK

Attesting Officer                    Acting Commissioner of Patents and Trademarks